United States Patent [19]
Crabb et al.

[11] 3,949,378
[45] Apr. 6, 1976

[54] COMPUTER MEMORY ADDRESSING EMPLOYING BASE AND INDEX REGISTERS

[75] Inventors: Robert P. Crabb, San Diego; Robert A. Unger, El Cajon; Jim A. Gilbreath, San Diego, all of Calif.

[73] Assignee: The United States of America as represented by the Secretary of the Navy, Washington, D.C.

[22] Filed: Dec. 9, 1974

[21] Appl. No.: 531,016

[52] U.S. Cl. .......................................... 340/172.5
[51] Int. Cl.² ....................................... G06F 13/00
[58] Field of Search ............................. 340/172.5

[56] References Cited
UNITED STATES PATENTS

| | | | |
|---|---|---|---|
| 3,287,703 | 11/1966 | Slotnick | 340/172.5 |
| 3,389,380 | 6/1968 | Ashbaugh | 340/172.5 |
| 3,401,376 | 9/1968 | Barnes | 340/172.5 |
| 3,461,434 | 8/1969 | Barton | 340/172.5 |
| 3,657,705 | 4/1972 | Mekota, Jr. | 340/172.5 |
| 3,699,528 | 10/1972 | Carlson | 340/172.5 |
| 3,787,813 | 1/1974 | Cole | 340/172.5 |

Primary Examiner—Raulfe B. Zache
Assistant Examiner—James D. Thomas
Attorney, Agent, or Firm—Richard S. Sciascia; Ervin F. Johnston; John Stan

[57] ABSTRACT

A memory addressing system which enables a computer to address a total of 1,048,575 words (32 times its original capacity) with minimal impact upon existing software. The method employed by this invention involves a new dual usage of the b (index) designator in each instruction word so that in addition to its normal function of specifying which of 8 index registers is to be added to the address portion of the instruction, it also specifies which of 8 base registers is to be arithmetically added to the basic 15-bit address to determine the final 20-bit absolute memory location address. A total of 262,144 words may be accessed by this dual use of the b designator for any one setting of the base registers. Each program module is designed to operate in a 32,768 word environment and no coding changes need be made to it; the computer operator need only maintain the appropriate offset values in the base registers for the module currently in operation.

3 Claims, 5 Drawing Figures

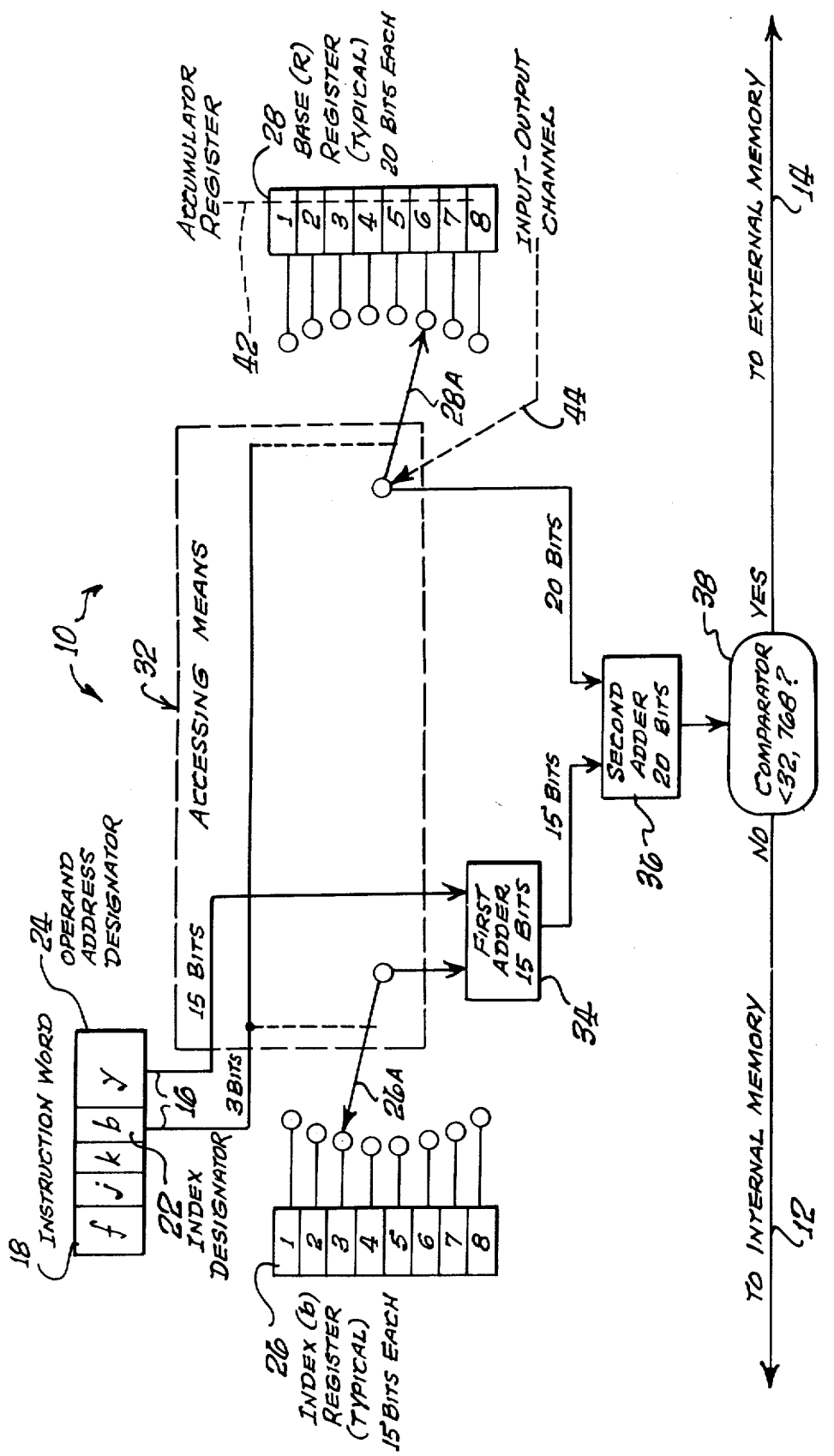
Fig. 1. Memory Addressing System with Dual Use of Index Designator.

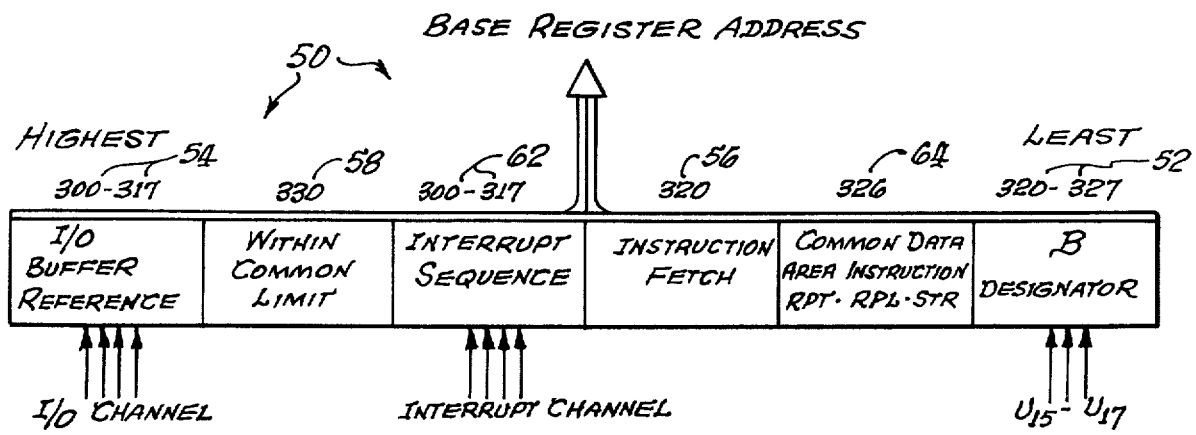
FIG. 2. BASE REGISTER PRIORITY ENCODING.
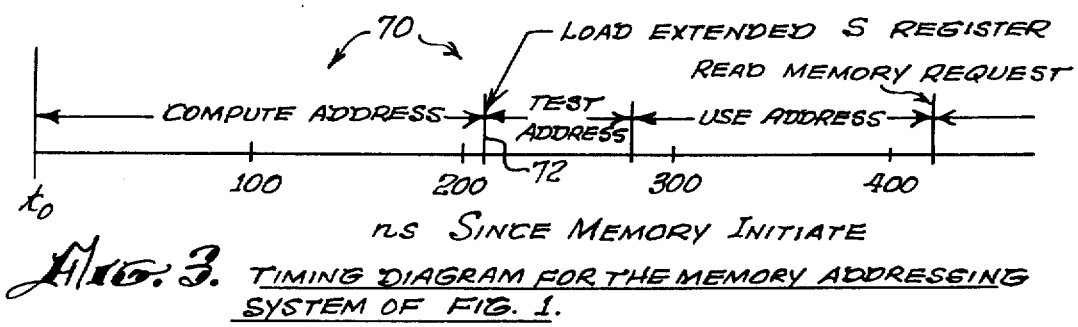
FIG. 3. TIMING DIAGRAM FOR THE MEMORY ADDRESSING SYSTEM OF FIG. 1.
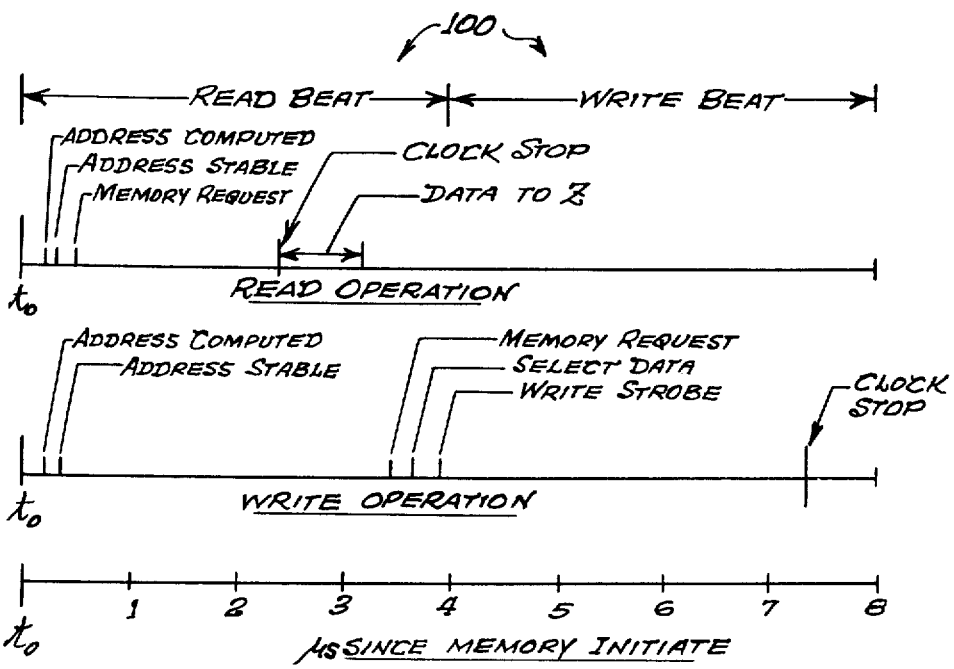
FIG. 4. EXTERNAL MEMORY ACCESS TIMING

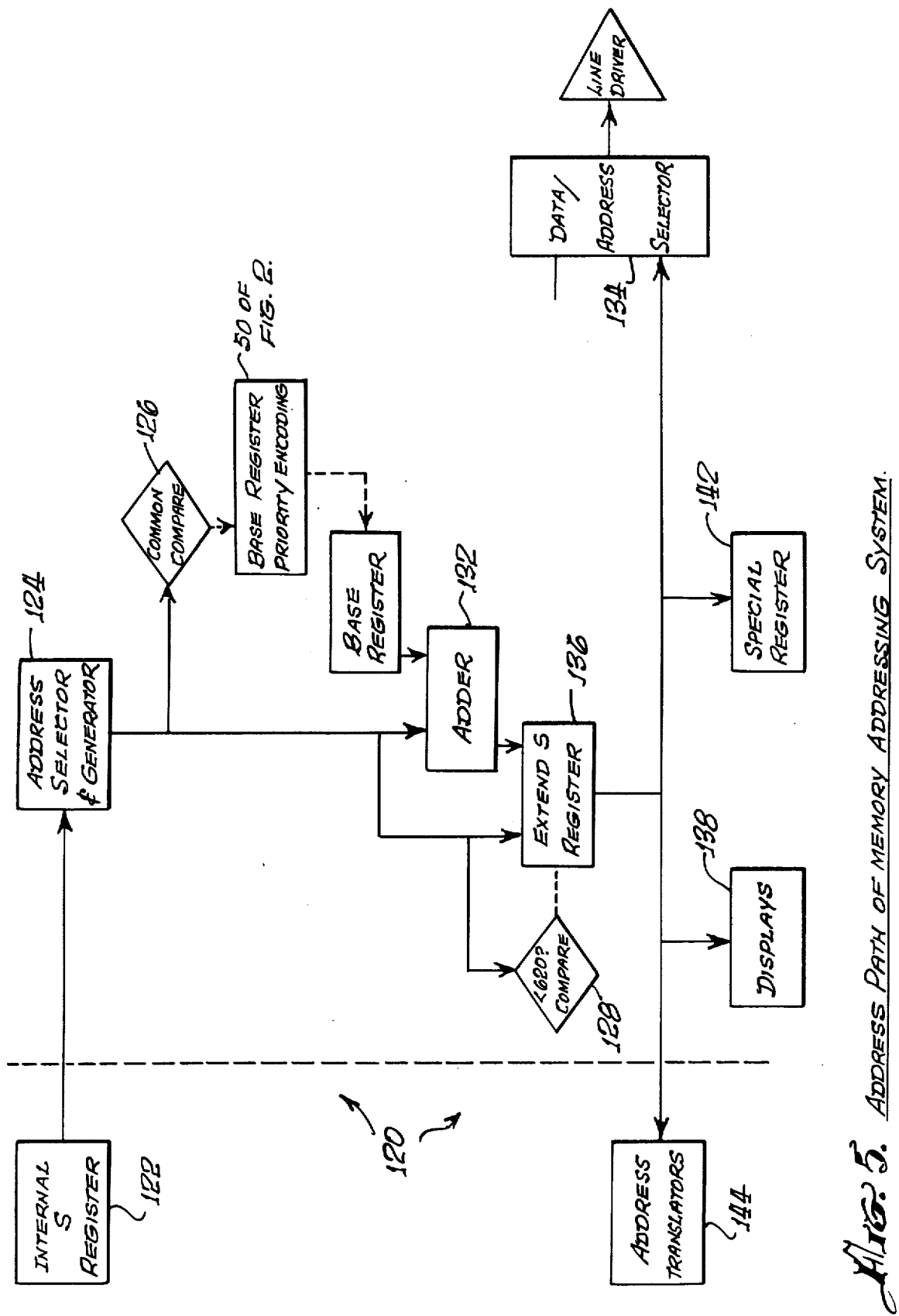

3,949,378

COMPUTER MEMORY ADDRESSING EMPLOYING BASE AND INDEX REGISTERS

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

The purpose of this invention is to greatly extend the memory capacity and useful lifetime of existing computers by providing a means of accessing a large external memory bank without requiring changes to existing operational program modules.

The Navy has grossly outgrown the memory capacity of its shipboard computers, which were designed to have a maximum memory size of 32,768 words. The prior art solution was to add more computers, and some ships now have as many as four computers, each having access only to its own internal memory. This procedure is an unsatisfactory way of adding memory to the system, since a very large volume of inter-computer communication must occur just to keep each machine's data base updated. This is a slow process since it must take place under program control (which robs time from worker programs) and at input/output speeds which are very much slower than memory speeds.

SUMMARY OF THE INVENTION

This invention relates to a system for computer memory addressing which permits accessing to an original, internal, memory of a computer whose capacity in words is no longer adequate as well as to an additional, external, memory which extends the capacity to an adequate level. The system comprises: means for accessing an instruction word generated by the internal memory, the word including an index designator and an operand address designator; an index register, each of whose cells have the capability of containing N bits; a base register, each of whose cells have the capability of containing N + K bits; means connected to the accessing means to receive the index designator for simultaneously accessing corresponding cells in the index and base registers; a first adder, coupled to receive the operand address designator and the accessed signal of the index register; a second adder, coupled to receive the output signal of the first adder and the accessed signal of the base register; a comparator, whose input is the output of the second adder, which compares the magnitude of the address of the instruction word from the second adder with the magnitude of a word representing the capacity of the original, internal, memory, and has an output signal which is alternatively directed to (1) the internal memory if the magnitude of the address of the instruction word is at least equal to the capacity of the internal memory; and (2) to the external memory if the magnitude of the input word is greater than the capacity of the internal memory.

OBJECTS OF THE INVENTION

An object of the invention is to provide a system for computer memory addressing which greatly extends the memory capacity of an existing computer.

Another object of the invention is to provide an addressing system which extends the lifetime of an existing computer by not necessitating its replacement solely due to an inadequate memory.

Yet another object of the invention is to provide an addressing system which obviates the necessity of purchasing new, complete, computers when only additional memory capacity is required.

Other objects, advantages and novel features of the invention will become apparent from the following detailed description of the invention, when considered in conjunction with the accompanying drawings wherein:

BRIEF DESCRIPTION OF THE DRAWINGS

FIG. 1 is a block diagram of the memory addressing system of this invention, using an index designator of an instruction word for two purposes.

FIG. 2 is a block diagram showing the base register priority encoding.

FIG. 3 is a timing diagram for the memory addressing system shown in FIG. 1.

FIG. 4 is a timing diagram for the external memory access timing.

FIG. 5 is a block diagram showing the address path of the memory addressing system.

DESCRIPTION OF THE PREFERRED EMBODIMENTS

Referring now to FIG. 1, this figure shows a system 10 for computer memory addressing which permits accessing, by lead 12, to an original, internal, memory whose capacity in words is no longer adequate as well as, by lead 14, to an additional, external, memory which extends the capacity to an adequate level. The system comprises means 16 for accessing to an instruction word 18, the word including an M-bit index designator 22 and an N-bit operand address designator 24 for extending the operand addresses. The addressing system 10 includes an index register 26, each of whose cells contains N bits.

A base register 28 has cells each of which contain N + K bits.

The base register 28 is not in the original computer. Its function is to offset all addresses in a given class by a given amount. With a fixed-length addressing field, for example of 15 bits (32,768 words), and with a basic memory of 256,000 words, for example, it requires use of a base register 28. Assuming only one base register 28, for simplicity, it is set to a value which may be added to every address, so that now instead of addressing only the first 32,768 words, any block of 32,768 words may be addressed. If, in addition, under program control, the value of the base register be changed, so that some other block of 32,768 words may be addressed, the addressing of all 256,000 words is possible. The base register 28, as shown in FIG. 1, is representative of 25 base registers actually used.

Means 32, generally electronic, are connected to the index designator 22 for simultaneously accessing corresponding cells in the index and base registers, 26 and 28.

A first adder 34, capable of handling 15 bits, is coupled to receive the operand address designator 24 and the accessed signal of the index register 26. A second adder 36 is coupled to receive output signal of the first adder 34 and the accessed signal of the base register 28.

Both inputs to the second adder 36 have 20 bits when they are added together, the 15-bit input from the first adder 34 having five hard-wired virtual bits with a value of zero.

A comparator 38, whose input is the output of the second adder 36, compares the magnitude of the address of the instruction word 18 with the magnitude of a word generated within the comparator representing the capacity of the original, internal computer memory, and generates an output signal which is alternatively directed to (1) the original, internal, memory, by lead 12, if the magnitude of the address of the instruction word 18 is at least equal to the capacity of the internal memory; or (2) to the external memory, by lead 14, if the magnitude of the address of the instruction word 18 is greater than the capacity of the internal memory.

The computer memory addressing system 10 may further comprise means 42 for connecting the base register 28 to an accumulator-register of the computer, for loading and reading the base register. "Accumulator-register" is a standard term for the arithmetic register in the computer.

The computer memory addressing system 10 may further comprise means 44 for connecting the base register 28 to an input-out channel of the computer, for extending the input and output of the computer.

The rotating arms (electronic switches), 26A and 28A, for the index register 26 and the base register 28 are at corresponding positions at all times, but the accumulator arm 42 and the input-output channel arm 44 need not be at corresponding positions because they are controlled in a different manner by a different path.

Discussing now the theory behind the mode of operation, and referring to the base register priority encoding shown in FIG. 2, when in the expanded mode, 32 words of 20-bit bipolar semiconductor memory (60-nanosecond speed) logically replaces the slower (2–8 microsecond) core memory normally accessed through addresses 300–337 (octal). Addresses 320–327, 52, called R1 - R7, are operand base registers, and are selected by the dual use of the b designator 22 for simultaneous selection of index and base register, 26 and 28, as shown in FIG. 1.

Addresses 300 through 317, labeled 54, contain 20-bit base registers for I/O channels 0 through 15 respectively. They are used for I/O buffering and also for processing during an interrupt, where they are labeled 62. Address 320, 56, is the normal instruction fetch base register.

Address 330, 58, which is a common access register, is used to reference instructions and data which reside in memory addresses below the limit defined by a 15 bit-number in address 331, not shown. Address 331 is called the limit register. It is used to define the upper boundary of the common data area, but not to generate an address.

The required 20-bit address for an extended memory reference is formed by the 1's complement addition of the 20 bits from the appropriate base register and the 15 bits of the basic operand 52 instruction, or buffer control word address 54.

Memory operation begins with an internally generated memory initiate signal. This is a signal that starts the internal memory timing chain that runs for all memory references whether the actual location referenced is internal or not. At this time there is a 15-bit address in the S register, 122 in FIG. 5. The "S" register is a 15-bit address in the memory address register of the original computer. This is the address that would have been fed to the internal address translators, if there were no extended memory 10 modification, for example, a solid state extended memory (SSEM) modification. A "translator", 144 in FIG. 5, in the context of this invention, takes the input address, which is 15 bits long, and selects from those bits four lines to drive currents down to select the address. This address might be for an instruction, operand, or I/O buffer type of memory reference.

This 15-bit address is constantly compared with two limits. The first is an absolute octal address of 617. If the basic address is 617 or less, then no address modification is ever made. This allows direct access to all fixed memory locations in the computers used. The second is the common limit 58, which is program specified. If the basic address is less than or equal to the common limit 58, then the effective memory address will be generated using the common base register 28 value, which is also program specified. The result of the common compare 126 is gated with information concerning the type of memory reference to determine which base register 28 is appropriate. The priority of base register selection is diagrammed in FIG. 4—4 and listed below:

| | |
|---|---|
| I/O NOT EXTERNAL FUNCTION (NOT EX FCT) | 300–317 |
| COMMON | 330 |
| INTERRUPT | 300–317 |
| INSTRUCTION | 320 |
| REPEAT, REPLACE, STORE (RPT*RPL*STR) | 326 |
| B REGISTER | 320–327 |

The content of the selected base register is added to the 15-bit address, resulting in a 20-bit address. (If the expanded mode is disabled, selection of the 15-bit unmodified address is forced). The result of the comparison in comparator 38, FIG. 1, is used to select either the 15-bit unmodified address, or the 20-bit summed address. The parameters just cited apply to a specific computer. The parameters would vary for other types of computers.

Referring now to the timing diagram 70 shown in FIG. 3, 210 nanoseconds, at time 72, after the memory cycle is initiated at time $t_o$, when the resulting address computation is complete, the address is latched into the extended 20-bit address register.

This absolute address is examined to determine which form of memory is to be referenced-internal core, semiconductor random access memory (RAM), or external memory. At this time the displays and a special register are loaded if appropriate to the type of memory reference being made. This special register registers a 16-cell store to keep track of the last 16 instructions that were executed.

The gating is allowed 70 ns to stabilize. If the internal memory location is to be accessed, the memory timing continues without any inhibitions, as if there were no modification. When the expanded mode is disabled by means of a switch on the front panel, or by auto recovery, the basic address is passed to the address translators without change.

If the memory reference is not an internal core location, both the internal read and write strobes are inhibited. Due to the pronounced speed differences between the internal memory (8 microseconds) versus the external memory (1 microsecond), the read and write operations must be considered differently for the external references (see timing diagram 100 in FIG. 4). For read references, the external memory request is given as soon as the address lines have had time to stabilize ($t=420$ns). If the external memory reference is not complete at $t=2400$ns, the clock phases are stopped until the reference is complete, for at this time the data is selected into the memory data register. Because the original timing is based on an 8 microsecond cycle, the write data is not necessarily in the memory data register until $t=3500$ns. The memory request for write is given at this time. 140ns later the path to the extended memory is switched from address to data, followed 350ns later by the write strobe. If the memory reference is not completed in about 3 microseconds, the clock phases are inhibited until the external memory reference is complete. The base registers are read and written with the same control signals as the extended memory.

The modification affects both the S and memory data registers and their associated signal paths. Referring now to the embodiment 120 shown in FIG. 5, the internal address path is broken at the output of the S register 122 where it is fed into the I/C address modification circuitry. It first goes through the address generator and selector 124. From there it goes to the two comparators, 126 and 128, the adder 132 and the data address selector 134. Compare 128 determines whether the address is less than 620. If so, then special action is taken, namely to use the address unmodified. The address selector 134 is actually a selector with storage, and serves as an extended S register. The output of the extended S register 136 is used to determine which form of memory is to be referenced-internal core, semiconductor RAM, or external memory. It also goes to the displays 138 and to the special register 142 referred to hereinabove. Both the true and the complement of the extended S register 136 are returned to the internal address translators 144. The output of the extended S register 136 also goes to the data/address selector 134 since the address path to the external memory is shared with the data path to reduce the needed number of transmission lines.

Some of the advantages and new features of this invention are:

a. It allows direct accessing of a large memory of up to 1,048,575 words.

b. By dual use of an index designator, it allows direct access to 262,144 (=8 × 32,568) words without changing base register offset values.

c. Existing operational program modules need not be modified, resulting in great savings in time and software costs.

d. It eliminates the need for extensive inter-computer communications, since a common data base may be used.

e. It permits the running of operational programs which formerly required four computers in two computers, thus conserving space, and power, and reducing weight and complexity aboard ship.

f. It extends the useful lifetime of existing Navy shipboard computers by approximately 10 years, thus saving millions of dollars for equipment replacement and reprogramming.

Obviously many modifications and variations of the present invention are possible in the light of the above teachings. It is therefore to be understood that within the scope of the appended claims the invention may be practiced otherwise than as specifically described.

What is claimed is:

1. A system for computer memory addressing which permits accessing to an original, internal, memory of a computer whose capacity in words is no longer adequate as well as to an additional, external, memory which extends the capacity to an adequate level, the system comprising:

means for accessing an instruction word generated by the internal memory, the word including an M-bit index designator and an N-bit operand address designator;

an index register, each of whose cells have the capability of containing N bits;

a base register, each of whose cells have the capability of containing N + K bits, for offsetting all addresses in a given class by a given amount;

means connected to the accessing means to receive the index designator for simultaneously accessing corresponding cells in the index and base registers;

a first adder, coupled to receive the operand address designator and the accessed signal of the index register;

a second adder, coupled to receive the output signal of the first adder and the accessed signal of the base register; and;

a comparator, whose input is the output of the second adder, which compares the magnitude of the address of the instruction word with the magnitude of a word generated within the comparator representing the capacity of the original internal memory, and generates an output signal which is alternatively directed to 1. the internal memory if the magnitude of the address of the instruction word is at least equal to the capacity of the internal memory; and 2. to the external memory if the magnitude of the address of the instruction word is greater than the capacity of the internal memory.

2. The computer memory addressing system according to claim 1, further comprising:

means for connecting the base register to an accumulator register of the computer for writing into and reading out of the base register.

3. The computer memory addressing system according to claim 1, further comprising:

means for connecting the base register to the input-output channel of the computer for extending the input and output of the computer.

* * * * *